United States Patent [19]

Henao

[11] 4,291,792
[45] Sep. 29, 1981

[54] CLUTCH ASSEMBLY WITH MODULATED CUSHION FULCRUM

[75] Inventor: Alvaro Henao, Rochester, Mich.

[73] Assignee: Borg-Warner Corporation, Chicago, Ill.

[21] Appl. No.: 106,598

[22] Filed: Dec. 26, 1979

[51] Int. Cl.³ ............................................. F16D 13/44
[52] U.S. Cl. ............................. 192/89 B; 192/109 A
[58] Field of Search ............... 192/30 V, 89 B, 98 A, 192/109 A, 109 B, 109 F, 111 A, 70.27; 200/159 A, 159 R, 340

[56] References Cited

U.S. PATENT DOCUMENTS

| | | |
|---|---|---|
| 946,155 | 1/1910 | Runge .......................... 192/109 A X |
| 1,915,732 | 6/1933 | Goldschmidt . |
| 3,235,049 | 2/1966 | Hufstader . |
| 3,236,349 | 2/1966 | Wiggins et al. . |
| 3,240,305 | 3/1966 | Hirano ............................ 192/109 A |
| 3,323,624 | 6/1967 | Maurice .......................... 192/109 A |
| 3,541,286 | 11/1970 | Schwab et al. ................. 200/340 X |
| 4,031,986 | 6/1977 | Thompson ................... 192/111 A X |
| 4,055,238 | 10/1977 | Haraikawa et al. ........... 192/30 V X |

Primary Examiner—George H. Krizmanich
Attorney, Agent, or Firm—James A. Geppert

[57] ABSTRACT

A friction transmitting device for automative vehicles utilizes a clutch assembly containing a diaphragm spring and a pressure plate having a fulcrum surface with an elastic device therein providing modulating means for engagement of the clutch plate. The elastic device comprises several spring-biased fulcrum members located in openings formed in the pressure plate fulcrum surface to be engaged by the diaphragm spring and cushion engagement of the clutch.

8 Claims, 5 Drawing Figures

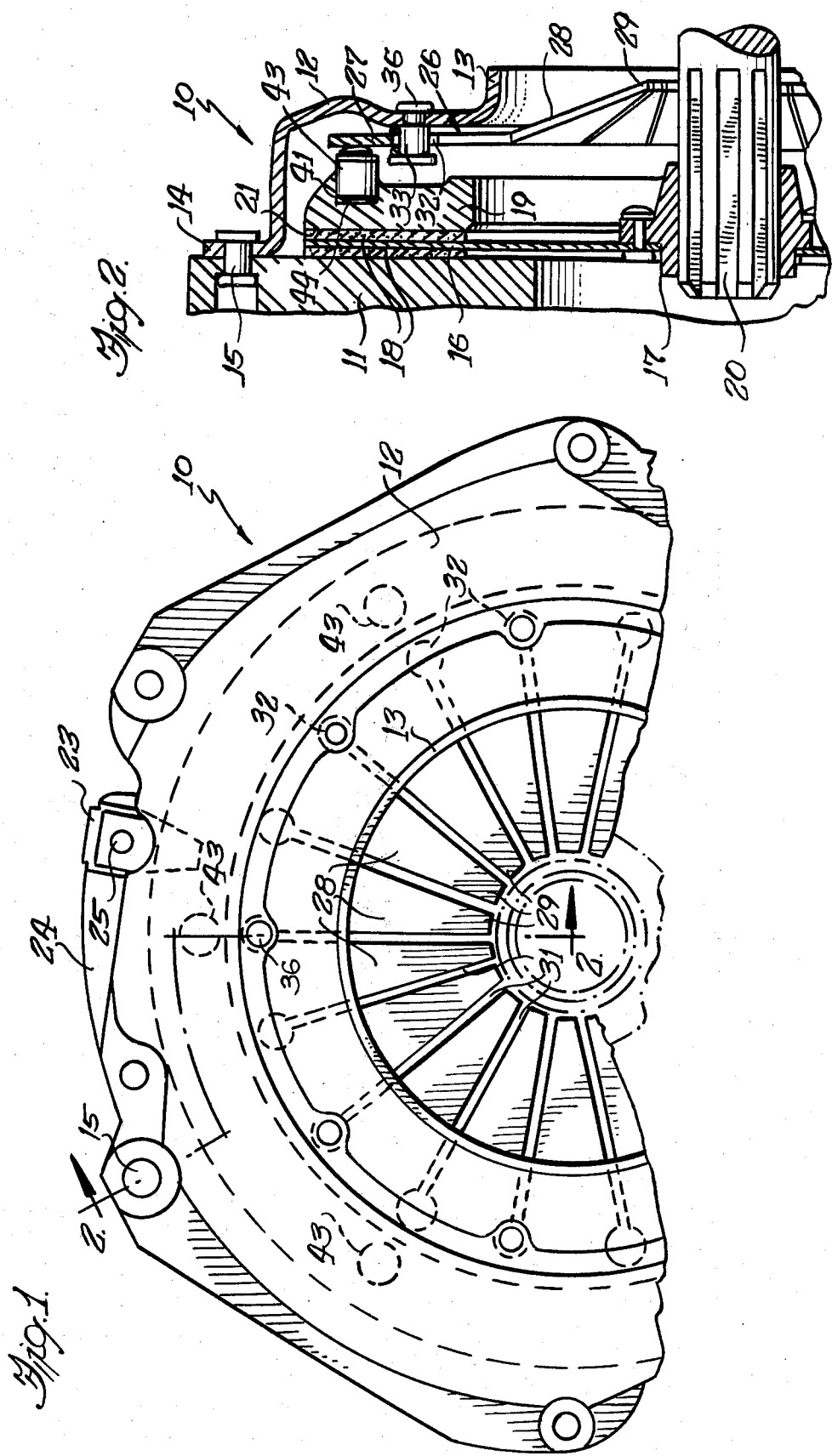

CLUTCH ASSEMBLY WITH MODULATED CUSHION FULCRUM

BACKGROUND OF THE INVENTION

In a conventional friction clutch for an automotive vehicle or similar application, a clutch disc having opposed friction faces adjacent the periphery is positioned between and driven by frictional engagement with a flywheel rotated by the vehicle engine and a pressure plate rotatably connected to and axially movable toward and away from the flywheel. The clutch disc is operatively connected to an input shaft leading to the vehicle transmission. A diaphragm or Belleville spring is utilized in the clutch assembly to urge the pressure plate towards the clutch disc and move the disc into engagement with the flywheel; the diaphragm spring generally being pivotally mounted on the cover for the clutch assembly.

Depending on the vehicle operator, a rapid release of the clutch pedal could result in a sudden grabbing or engagement of the disengaged clutch disc by the rotating pressure plate and flywheel resulting in a sudden shock to the clutch disc. This sudden engagement does not provide a smooth ride for the vehicle and seriously reduces the effective life of the clutch, whether of the rigid or progressive type.

To avoid the grabbing action and resulting shock to the clutch disc, a cushioning arrangement is necessary to obtain a desired smooth clutch engagement providing a steady and progressive action from the initial point of clutch engagement to the point when all slip ceases with a positive clutch engagement. Early efforts to provide this cushioning effect included a series of small springs riveted between the friction facings of the clutch disc to bias the facings axially outwardly. Other versions have involved an elongated cushioning spring mounted in the fulcrum edge on the pressure plate. The present invention provides an improved means to obtain modulation of engagement of the friction elements of the clutch.

SUMMARY OF THE INVENTION

The present invention relates to an improved friction transmitting mechanism containing an elastic device that results in a new modulating means for engagement of the friction clutch. This device is mounted in series with the engaging means in a minimum of three positions equally distributed in the pressure plate, depending upon the type of clutch, and at a maximum of multiples of three according to the circumference available. The engaging means comprises a series of fulcrum bars, plugs or pins resiliently mounted in openings formed in the pressure plate fulcrum surface.

The present invention also relates to a novel friction transmitting mechanism that can be used in all types of clutches in which the engagement conditions are improved to ensure a better application of the forces applied in operating the clutch. Also, the mechanism will increase the useful life of the friction disc and improves the engagement conditions when in a steady and progressive action from the initial point of engagement at which the clutch disc begins to be driven by the flywheel and pressure plate to the point at which all slip ceases. This engagement takes place in a very smooth way.

The present invention further relates to a novel friction transmitting mechanism that is positioned between the pressure plate and the diaphragm spring and has an elastic force lower than the engaging means; the mechanism having a predetermined amount of travel between a point of minimum force or pre-stress and a point of maximum stress in such a way that this mechanism will allow the modulating effect to take place.

Further objects are to provide a construction of maximum simplicity, efficiency, economy and ease of manufacture, installation and operation, and such further objects, advantages, and capabilities as will later more fully appear and are inherently possessed thereby.

DESCRIPTION OF THE DRAWINGS

FIG. 1 is a partial rear elevational view of a friction clutch assembly embodying the present invention.

FIG. 2 is a partial cross sectional view taken on the irregular line 2—2 of FIG. 1.

DESCRIPTION OF THE PREFERRED EMBODIMENT

Figure 3:
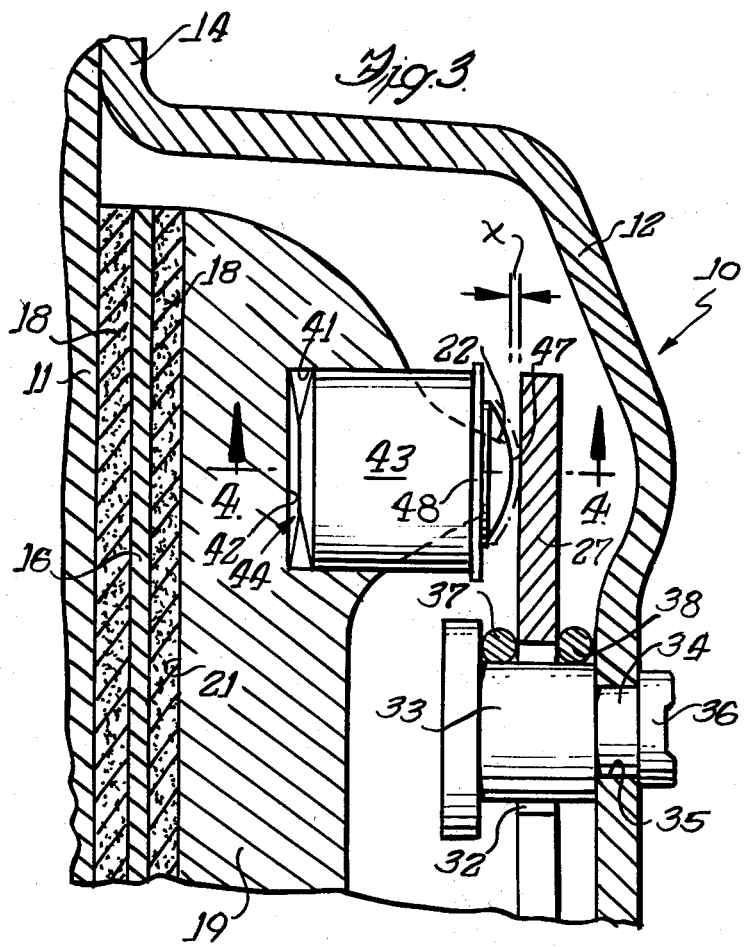
FIG. 3 is an enlarged partial cross sectional view showing the fulcrum and cushioning means of FIG. 2.

Referring more particularly to the disclosure in the drawings wherein is shown an illustrative embodiment of the present invention, FIGS. 1 and 2 disclose a friction clutch assembly 10 having the cushioning means of the present invention incorporated therein; the clutch assembly including a flywheel 11 and a clutch cover 12 having a central flange 13 defining an opening to receive a suitable clutch release bearing (not shown) and a peripheral flange 14 adapted to be secured to the flywheel by bolts or rivets 15. A clutch disc 16 has a central internally splined hub 17 receiving the end of a transmission input shaft 20 and oppositely disposed friction facings 18, 18 at the outer periphery thereof.

An annular pressure plate 19 has a friction surface 21 facing one of the friction facings 18 and the opposite surface of the plate is provided with a rearwardly extending generally annular fulcrum surface 22. The pressure plate is also provided with several circumferentially equally spaced drive lugs 23 secured to drive straps 24 by rivets 25; the opposite ends of the straps being secured to the cover in a conventional manner to rotate the pressure plate with the flywheel and clutch cover. A diaphragm spring 26 includes a generally conical body portion 27 with a plurality of inwardly extending spring fingers 28 terminating in inner ends 29 adapted to be engaged by the clutch release bearing. The fingers 28 are separated by radially extending slots 31 terminating in enlarged openings 32 adjacent the body portion 27. Extending through several circumferentially equally spaced openings 32 are shouldered rivets 33 having reduced ends 34 extending through openings 35 in the cover 12 and headed at 36. Positioned on the opposite surfaces of the spring body portion 27 and retained on the enlarged heads of rivets 33 are a pair of wire hoops 37 and 38 acting as pivot surfaces for the diaphragm spring 26 during clutch engagement or disengagement.

Located within the fulcrum surface 22 are at least three circumferentially equally spaced holes 41 drilled into the pressure plate and providing bottom surfaces 42. Located within each hole is a fulcrum pin or plug 43 over an elastic cushion 44; here shown as a pair of diaphragm spring washers 45. Each pin 43 has a body conformably received in the hole 41 and terminates in a reduced rounded outer end 47 defining a shoulder 46. The pins are biased outwardly by the cushions 44 so that the rounded ends 47 engage the diaphragm spring 26; the pins each having an extent of axial movement indicated as "x" as seen in FIG. 3. When moved to their inner positions, the rounded ends 47 of the pins 43 coincide or are aligned with the outer edge of the fulcrum surface 22.

Figure 4:
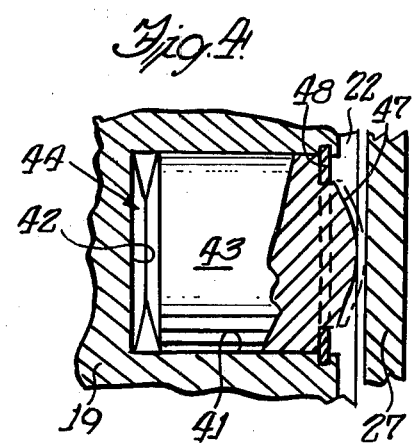
FIG. 4 is a cross sectional view with portions in elevation taken on the line 4—4 of FIG. 3.
Figure 5:
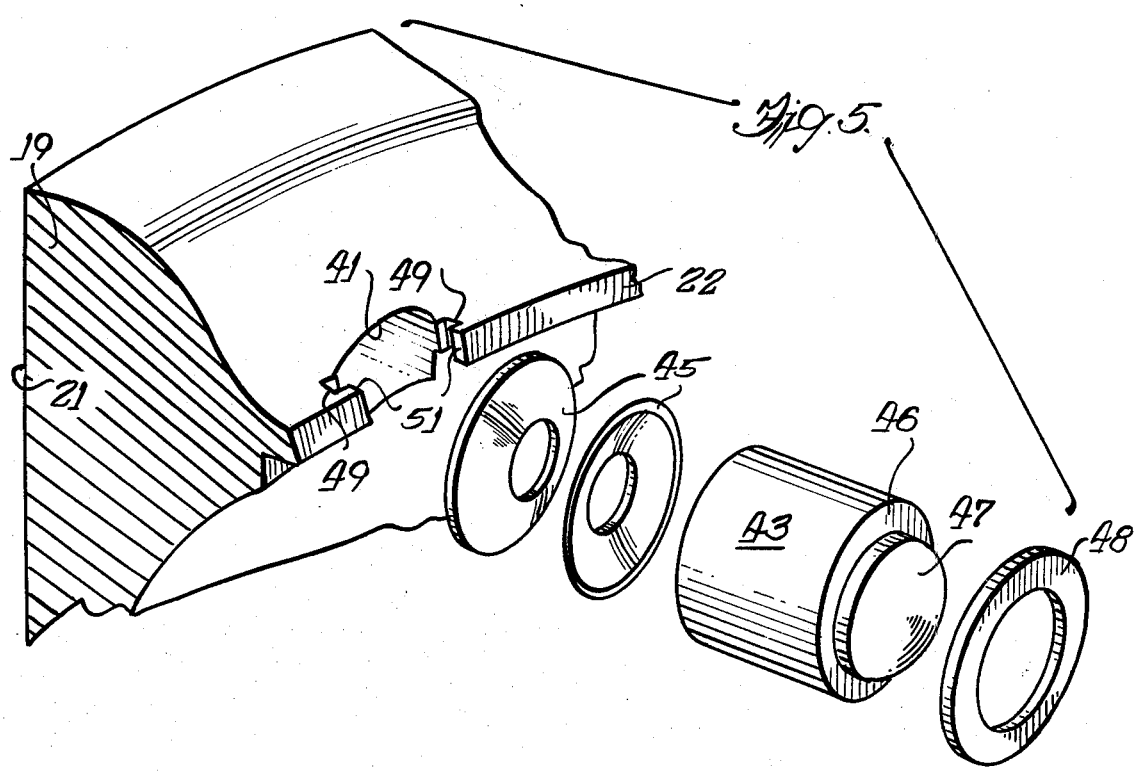
FIG. 5 is an enlarged exploded perspective view of the cushioning means.

As seen in FIGS. 3 and 4, a snap ring 48 is received on the shoulder 46 of each pin or plug 43 and is located in a snap ring slot 49 formed in facing surfaces 51 of the fulcrum edge 22 formed during the drilling of the holes 41. The snap ring 48 provides a pre-stress condition upon the pins or plugs 43 to control the travel of these pins over the distance "x". If the pre-stress condition is not required, the snap ring can be omitted. The modulated cushion effect obtained through the cushion 44 under each pin or plug is calculated by the load or force that this cushion will exert at the bottom of the pin 43. The maximum force is obtained when the diaphragm spring 26 is in direct contact with the ends 47 of the pins 43 and the fulcrum edge 22 of the pressure plate.

As seen in FIG. 2, the clutch disc 16 is fully engaged between the flywheel 12 and the pressure plate 19, and the pins or plugs 43 have been urged into the holes 41 against the force of the cushions 44 so that the rounded ends 47 are in alignment with the fulcrum edge 22. When the vehicle operator depresses the clutch pedal (not shown), its action moves the clutch bearing against the inner ends 29 of the spring fingers 28 to cause the diaphragm spring 26 to pivot around the wire hoop 38 and release the force on the pressure plate maintaining the friction clutch disc engaged. As the pivotal movement proceeds to decrease the force on the pressure plate, the pins or plugs 43 are urged by the cushions 44 to move through the distance "x" and, with this movement, the pressure plate is retracted by the drive straps 24 to disengage the clutch.

For reengagement of the clutch, the clutch pedal is released to retract the clutch bearing and allow the diaphragm spring to pivot about the wire hoop 37 and return to its original position. Pivotal movement of the diaphragm spring 26 acts on the pins or plugs 43 to urge the pressure plate 19 towards initial contact with the clutch disc 16 and moves the disc into engagement with the flywheel 12. As the initial contact between the clutch disc 16 and the flywheel and pressure plate is increased, the spring 26 urges the pins or plugs 43 against their resilient cushions 44 from their position of pre-stress through the distance "x" up to the position of full stress where the plug ends 47 are moved into alignment with the fulcrum edge 22. Thus, the pins or plugs modulate the force of the diaphragm spring acting on the pressure plate by permitting a progressive loading through the travel of distance "x" to diminish the notorious or grabbing contact of the friction disc with the flywheel of the engine. Once the pins or plugs are seated in the holes, then the maximum force of the diaphragm spring is exerted on the fulcrum edge 22 to finish the complete engagement of the clutch.

Although the pin or plug 43 is shown as a generally cylindrical member, these members may be of any suitable type of material shaped into a fulcrum bar, pin or plug of different lengths and machined into different end configurations, such as conical, spherical, triangular, etc., and placed into holes of differing diameters and depths drilled into the pressure plate. At the bottom of these holes are placed any type of cushion-like cone washers, Belleville springs, helicoidal springs or waved spacers formed of any resilient material. The depth and diameter of these holes vary according to the size and type of the clutch, and the dimensions and specifications of the plug vary in load, travel and type of material according to the predetermined effect for any particular clutch design. A minimum of three pins 43 are utilized in the fulcrum surface, however, more than three pins may be used. The total number of pins is preferably in multiples of three.

I claim:

1. In a vehicle clutch having a cover secured to a flywheel, a clutch disc, an axially reciprocable pressure plate and a diaphragm pivotally mounted in the cover, the pressure plate adapted to engage the clutch disc with the flywheel and having a fulcrum surface engageable by the diaphragm spring to engage the clutch, the improvement comprising at least three circumferentially equally spaced fulcrum members comprising plugs having reduced outer ends defining shoulders on the plugs, said pressure plate having holes drilled in the fulcrum surface to receive the fulcrum members, and cushioning means in each hole urging the members beyond the fulcrum surface to initially engage the diaphragm spring as the clutch is engaged, said cushioning means having an elastic force lower than the engaging force of said diaphragm spring, said fulcrum members having a limited extent of travel from a first position wherein the reduced outer ends of said members project beyond the fulcrum surface to a second position wherein the outer ends are in alignment with said fulcrum surface.

2. A vehicle clutch as set forth in claim 1, in which said reduced ends have rounded outer surfaces.

3. A vehicle clutch as set forth in claim 1, including a snap ring located on the shoulder of each plug and received in slots formed in the walls of the holes below the fulcrum surface to provide a pre-stress on the plug under bias from said cushioning means.

4. A vehicle clutch as set forth in claim 1, wherein said cushioning means comprises one or more diaphragm spring washers in each hole.

5. A vehicle clutch as set forth in claim 1, wherein said cushioning means comprises a helicoidal spring.

6. A vehicle clutch as set forth in claim 1, wherein said cushioning means comprises one or more waved spacers.

7. A vehicle clutch as set forth in claim 1, in which said fulcrum members have conical reduced outer ends in contact with said diaphragm spring.

8. A vehicle clutch as set forth in claim 1, in which said fulcrum members have triangular reduced outer ends in engagement with said diaphragm spring.

* * * * *

UNITED STATES PATENT AND TRADEMARK OFFICE
CERTIFICATE OF CORRECTION

PATENT NO. : 4,291,792

DATED : September 29, 1981

INVENTOR(S) : Alvaro Henao

It is certified that error appears in the above—identified patent and that said Letters Patent is hereby corrected as shown below:

Column 4, line 24, after "diaphragm" insert -- spring --.

Signed and Sealed this

Fifteenth Day of December 1981

|SEAL|

Attest:

GERALD J. MOSSINGHOFF

Attesting Officer   Commissioner of Patents and Trademarks